(12) United States Patent
Wang et al.

(10) Patent No.: US 10,586,235 B2
(45) Date of Patent: Mar. 10, 2020

(54) DATABASE OPTIMIZATION CONCEPTS IN FAST RESPONSE ENVIRONMENTS

(71) Applicant: PayPal, Inc., San Jose, CA (US)

(72) Inventors: Xing Wang, Lianyungang (CN); Adam Cohen, Ramat Gan (IL); David Stein, Even Yehuda (IL); Chunmao Ran, Shanghai (CN); Itzik Levi, Tel-Aviv Yafo (IL); Doron Hai-Reuven, Kfar Saba (IL)

(73) Assignee: PAYPAL, INC., San Jose, CA (US)

( * ) Notice: Subject to any disclaimer, the term of this patent is extended or adjusted under 35 U.S.C. 154(b) by 278 days.

(21) Appl. No.: 15/592,709

(22) Filed: May 11, 2017

(65) Prior Publication Data
US 2017/0372317 A1 Dec. 28, 2017

Related U.S. Application Data

(63) Continuation-in-part of application No. 15/189,500, filed on Jun. 22, 2016.

(51) Int. Cl.
G06Q 20/40 (2012.01)
G06N 5/04 (2006.01)
G06N 20/00 (2019.01)
G06Q 20/10 (2012.01)
G06Q 20/08 (2012.01)
G06F 16/28 (2019.01)

(52) U.S. Cl.
CPC ........... *G06Q 20/4016* (2013.01); *G06N 5/04* (2013.01); *G06N 20/00* (2019.01); *G06Q 20/085* (2013.01); *G06Q 20/10* (2013.01); *G06F 16/285* (2019.01)

(58) Field of Classification Search
CPC .... H04L 9/32; G06Q 20/4016; G06Q 20/405; G06Q 20/102
See application file for complete search history.

(56) References Cited

U.S. PATENT DOCUMENTS

| | | | | |
|---|---|---|---|---|
| 7,458,508 | B1* | 12/2008 | Shao | G06Q 20/04 235/380 |
| 8,290,838 | B1* | 10/2012 | Thakur | G06Q 40/02 705/35 |
| 2007/0073519 | A1* | 3/2007 | Long | G06F 11/3636 702/185 |
| 2009/0044279 | A1* | 2/2009 | Crawford | G06F 21/55 726/26 |

(Continued)

*Primary Examiner* — Chau Le
*Assistant Examiner* — Vance M Little
(74) *Attorney, Agent, or Firm* — Haynes and Boone, LLP

(57) ABSTRACT

Rapidly handling large data sets can be a challenge, particularly in situations where there are millions or even hundreds of millions of database records. Sometimes, however, a service level agreement necessitates that a service return a response to a query in a small amount of time. Database organization techniques can be used that reduce potentially large datasets to smaller groups (neighbors) based on uncommon but shared attributes, in various instances. Using a limited set of related records, queries can be answered using a focused approximation based on characteristics of various identified clusters of records in the set of related records. A particular record may also be associated with an existing cluster of records based on that record's similarities to records in the cluster.

20 Claims, 5 Drawing Sheets

(56) References Cited

U.S. PATENT DOCUMENTS

| | | | |
|---|---|---|---|
| 2009/0307049 A1* | 12/2009 | Elliott, Jr. | G06Q 30/0201 |
| | | | 705/7.29 |
| 2010/0169137 A1* | 7/2010 | Jastrebski | G06Q 20/04 |
| | | | 715/215 |
| 2016/0203485 A1* | 7/2016 | Subramanian | G06Q 30/00 |
| | | | 705/44 |

* cited by examiner

| Name | Account ID | Country | Address | Tel. Num. | Email Address |
|---|---|---|---|---|---|
| John Smith | 1234 | US | 123 Main St | 512-555-1234 | js123@aol.com |
| Zhang San | 5678 | CN | 400 Qianmen St | 10-9876-5432 | zsan@xyz.com |
| Mario Rossi | 7890 | IT | 2003 Sheridan | 06-12345678 | mros@abc.com |
| Jane Smith | 3214 | US | 123 Main St | 512-555-1234 | jas@aol.com |
| 202 | 204 | 206 | 208 | 210 | 212 |

Account Cluster 200

FIG. 2 ns in a short
DATABASE OPTIMIZATION CONCEPTS IN FAST RESPONSE ENVIRONMENTS

CROSS REFERENCED TO RELATED CASES

This case is a continuation-in-part of and claims the benefit of priority of U.S. application Ser. No. 15/189,500, entitled "SYSTEM SECURITY CONFIGURATIONS BASED ON ASSETS ASSOCIATED WITH ACTIVITIES", filed on Jun. 22, 2016, the contents of which are herein incorporated by reference in their entirety.

TECHNICAL FIELD

This disclosure relates to computer system security, and more particularly, to automated machine learning related techniques that can be used to perform detection of fraud in real-time or near real-time and/or perform detection of various data anomalies.

BACKGROUND

Manipulation of large data sets can be problematic. When dealing with large amounts of information, processing times can be slow.

Thus, in big data environments, it may be impractical to rapidly analyze large numbers of database records in a short amount of time to reach a decision. However, service level agreements may require that a decision be reached rapidly. In some instances, this means that a system can be faced with the choice of either making a quick determination with low levels of information (with possible high levels of inaccuracy), or taking a longer amount of time to make a determination (with a greater degree of confidence, but affecting performance to a possibly unacceptable level).

BRIEF DESCRIPTION OF THE DRAWINGS

FIG. 2 illustrates a block diagram of one embodiment of an account cluster, according to some embodiments.

DETAILED DESCRIPTION

Figure 1:
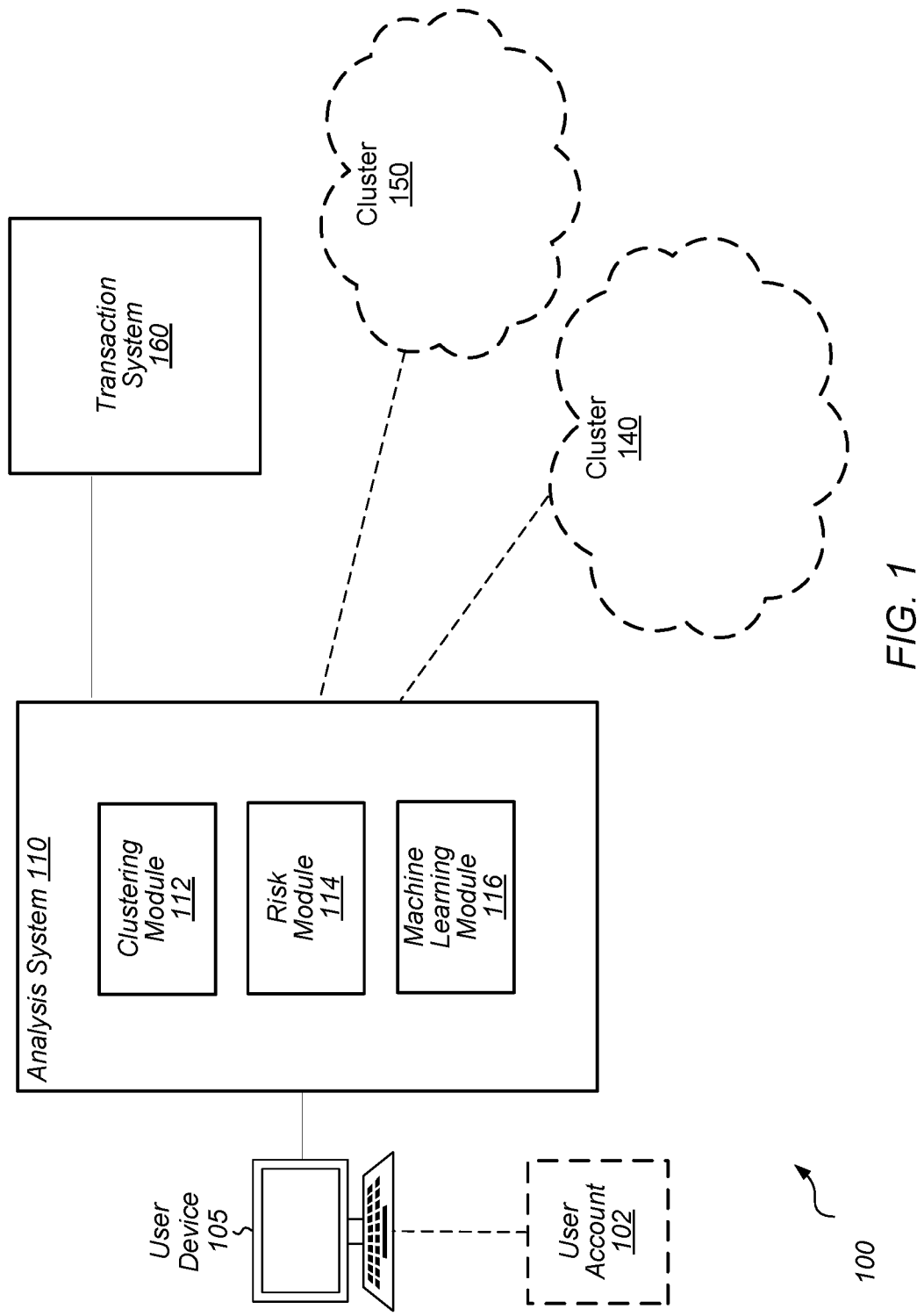
FIG. 1 illustrates a block diagram of a system that includes a user device, analysis system, and transaction system, according to some embodiments.

The present specification allows large numbers of database records to be narrowed to a more relevant tailored set of neighboring records, from which a determination can be rapidly made, in various embodiments. The database records may be for user accounts of an electronic transaction service, such as a payment transaction service. Data organization and algorithms described herein may allow for a rapid determination of fraud potential at higher levels of accuracy than prior techniques have been able to provide.

Various information may be collected when a user signs up for an account with a transaction service. This information can include contact information of various forms, such as email address, street address, phone number, city, state, country, etc. Payment related information may also be captured in some instances, such as a financial institution to which a user bank account is tied to the user account of the transaction service. Other information may be present as well.

When a user has a long and established transaction history, it may be easier to detect fraud. However, it may be generally difficult to assess fraud risk for a new account that does not have transaction history. One technique for overcoming this difficulty for assessing fraud risk, as discussed herein, is by sifting through a larger number of database records (e.g. for accounts) to identify a smaller list of records that may be predictive.

For a new account, a list of neighboring accounts can be constructed by querying a database to determine accounts that share at least one characteristic with the new account. This list of neighboring accounts may be built up preferentially based on least-common shared characteristics (for example, a postal code shared by 100 accounts may have more predictive value than a country code shared by 500,000 accounts). In some cases, very common values can also be blacklisted from the list-building process. (Note that a "neighboring" record does not necessarily imply a physical data storage relationship for media on which records may be stored.)

Once a list of neighboring records is established, potential target clusters for a new account can be determined. In various embodiments, each account is assigned to a particular cluster. From the list of neighboring records, a list of potential account clusters can be found. For each account cluster, a comparison can be made based with the new account based on account characteristics. The new account may then be assigned to the most relevant account cluster (or a new cluster can be created if the match does not rise above a threshold level of similarity).

Thus, an account cluster of similarly situated accounts to a new account can be determined. However, unlike the new account, other accounts in the account cluster may have established histories of usage (e.g. indicating whether or not those accounts are known to have engaged in fraud in the past). Depending on the cluster to which a new account is assigned, a fraud score for the new account may be higher or lower.

In some instances, this may be especially helpful in uncovering new account fraud, because fraudsters often may utilize multiple accounts. If a fraudster sets up or uses 25 new accounts over a period of time, for example, these accounts will frequently have certain similarities between them that can result in some or all of them being classified into a same cluster. If a cluster is known to contain a large percentage of fraudulent accounts, a new account assigned to that cluster may be deemed to be riskier.

Note that it is not necessary to have account usage history within an account cluster to make accurate predictions about fraud likelihood in various embodiments, though such information may be helpful. For example, a new account may be assigned to an account cluster with other new accounts as well that lack significant usage history (or perhaps lack any usage history). In this case, fraud prediction may still be made on the new account based on its assigned cluster—for example, a machine learning model can identify what "bad" (e.g. likelier to have fraudulent accounts) and "good" (less likely to have fraudulent accounts) clusters look like based on general characteristics, even without any account usage history. Overall, when deciding the fraud score of an account, in various embodiments a system can examine what a cluster looks like (e.g. various characteristics of the accounts in it), how close a particular account being evaluated for fraud belongs to the cluster (e.g., how close the similarities are to other accounts), a time for when the particular account joined the cluster, and other information from the particular account itself (e.g. which may be evaluated for risk on its own). In some embodiments, for example, account usage history may only be available in a slower off-line process while a faster (e.g. near real time) fraud detection system may not have any usage history available nonetheless, a pre-trained machine learning model can give a fraud score based on information that does not include account history.

The present techniques therefore utilize specific database and data organization technology to solve issues relating to accurately but quickly making a determination in a large data environment, particularly as it may relate to fraud.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes a user device 105, an analysis system 110, and a transaction system 160.

In one embodiment, user device 105 is associated with a user account 102. User account 102 may be a new user account that is being (or has recently been) applied for by a user. User account 102 allows a user to make electronic payment transactions, in various embodiments, as permitted by an electronic payment service such as that provided by PayPal™ Inc. In other embodiments, user account 102 may allow a user to make other types of electronic transactions.

Analysis system 110 is configured to perform various operations relating to fraud and risk analysis. As shown, analysis system 110 includes a clustering module 112, risk module 114, and a machine learning module 116. Each of these modules comprises computer-executable instructions, in various embodiments, stored on a non-transitory storage medium.

Analysis system 110 can perform operations related to classifying an account (e.g. a newly opened PayPal™ account) into a particular account cluster. Characteristics of that account, and the cluster it is in, can then be used to evaluate risk for the account. This may be particularly helpful when an account has very little usage history (or none), as information about characteristically similar accounts can essentially be used as a fill-in for information about the account with scant usage history.

Transaction system 160, in one embodiment, can perform operations for processing an electronic payment transaction. For example, transaction system 160 may receive a request to make an electronic payment from one account to another account. Risk information may be conveyed to transaction system 160 from analysis system 110 to allow transaction system 160 to make a more informed decision on whether or not to approve a particular transaction. Depending on an account's risk profile and/or certain information relating to the transaction, transaction system 160 may approve or decline the transaction. Note that in various embodiments, aspects of analysis system 110 and transaction system 160 may be combined and/or distributed across one or more various computing devices.

Analysis system 110 maintains account cluster information in various embodiments. As shown, analysis system 110 has information on account cluster 140 and account cluster 150. Each of these clusters includes a number of different accounts. Accounts may be added to the clusters in accordance with techniques discussed further below.

Turning to FIG. 2, a block diagram is shown of one embodiment of an account cluster 200. In this embodiment, account cluster 200 includes several accounts. As depicted, account cluster includes only four accounts, but as will be appreciated, an account cluster may have many different configurations.

An account cluster may include account records that have any type of account-related information in various embodiments. As shown, account cluster 200 includes various fields. Note that other information is maintained in some embodiments, but is omitted for ease of explanation of this figure.

The following explanations are given for the embodiment shown. Field 202 includes a name of a user. In row 1, for example, field 202 includes a name of "John Smith". Field 204 includes a unique account ID for a user. Field 206 includes a country code for the user (e.g., US=United States, CN=China, etc.). Address is a user's street address. Note that additional fields regarding address may be present (e.g., state or province, postal code, etc.). Field 210 includes a telephone number associated with a user account, and field 212 includes an email address associated with the user account. Note that in certain embodiments, the email address associated with an account may be used to make an electronic payment, e.g., via a service such as that provided by PayPal™. For example, users can direct an electronic payment to an account using only that account's associated email address.

As will be explained further below, various different account information can be used to group accounts together. This process may be done iteratively in some instances, for example, allowing clusters to be built up one account at a time by examining data for each account. In other instances, clusters may be established by bulk processing of multiple accounts at a time.

Figure 3:
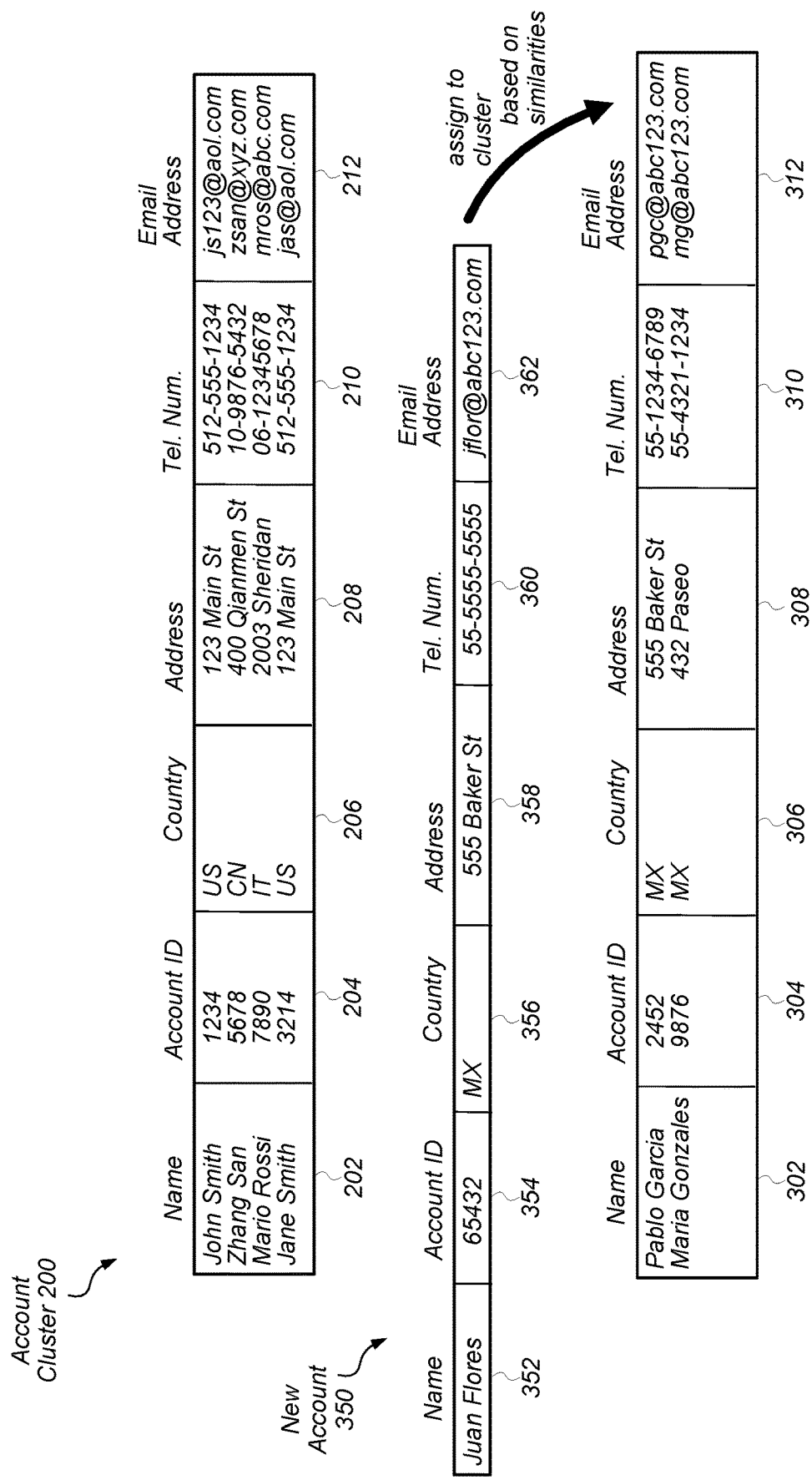
FIG. 3 illustrates an information flow diagram relating to how a new account may be assigned to an account cluster, according to some embodiments.

Turning to FIG. 3, an information flow diagram is shown of one example of a new account being assigned to an account cluster. In this example, new account 350 includes fields 352, 354, 356, 358, 360, and 362. Account cluster 300 includes accounts with entries for fields 302, 304, 306, 308, 310, and 312.

Analysis system 110 may decide whether to assign new account 350 to account cluster 200, account cluster 300, or another account cluster (or in some instances, may choose to make an entirely new account cluster based on the new account). In various embodiments, analysis system 110 may look at similarities between account characteristic data for new account 350 and the data for accounts within clusters

200 and 300. (Note that new account 350 in this example is an account that has not yet been used for an electronic payment transaction.)

In this brief example, new account 350 shares the same country code as both accounts in cluster 300, but shares no country code as the accounts in cluster 200. New account 350 also shares a same street address with the first account shown in the first row of cluster 300. New account 350 further shares a same email domain name (abc123.com) with both accounts in cluster 300, as well as an initial telephone number prefix (55). There are less similarities to account cluster 200 in this example, so analysis system 110 assigns new account to cluster 350.

Note that many different algorithms can be used to determine how to assign an account to a particular cluster. Some data may be given higher or lower weighting relative to other data (e.g. a shared exact phone number or exact street address may be weighted higher than a shared country code, for example). Data dependency may also be used to determine weightings for similarity purposes. For example, if a new account has the same basic street address as an account in another cluster (e.g. 555 Baker St), but the other account is in a different city, a different state, and/or a different country, the basic street address may not be given any weight (e.g. the two accounts might not have the same actual physical location associated with them due to one or more discrepancies in the data). Solutions provided herein are therefore not limited to one specific clustering algorithm. One type of clustering algorithm that is supported, however, is an algorithm that can operate in a streaming manner in which accounts are processed and assigned to clusters on a one-at-a-time basis. Other clustering algorithms could process and assign accounts to clusters based on batching, however (e.g. the system could wait for 20 or 50 new accounts, or operate on a time interval basis such as seconds, minutes, hours, etc.) and then assign clusters to potentially multiple accounts at one time as part of a batch process.

The example of FIG. 3 is provided for illustration of how a new account might be assigned to a particular cluster. This specification is not limited to this example however, and further details on this process are provided below.

Figure 4:
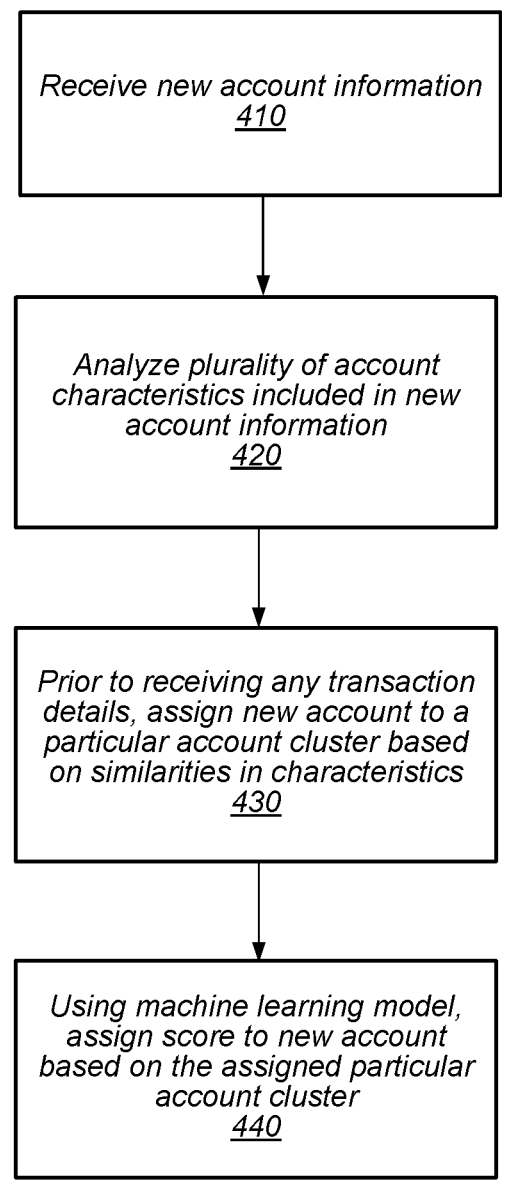
FIG. 4 illustrates a flowchart of a method that relates to classifying an account into a cluster, according to some embodiments.

Turning to FIG. 4, a flowchart diagram is shown of one embodiment of a method 400 that relates to classifying a user account into a cluster and using a machine learning model to determine a risk score, even without having any transaction information available for the user account. Thus, risk of fraud can be more accurately assessed in a newly opened account, in various embodiments. In particular, however, techniques herein that are used to correlate information, perform clustering, and allow risk estimates provide technical advantages by providing more accuracy based on less information, in various instances.

Operations described relative to FIG. 4 may be performed by any suitable computer system. For ease of explanation, however, the operations will be described relative to analysis system 110.

In operation 410, in one embodiment, analysis system 110 receives new account information for a new account corresponding to an electronic transaction service. In various embodiments, the new account has not yet conducted an electronic transaction via the electronic transaction service (e.g., the new account hasn't been used for an electronic payment transaction). In another embodiment, the new account may have been used for a limited number of electronic transactions, but the total number of transactions conducted using the new account falls below a threshold number of transactions that might allow more accurate risk of fraud assessment based on past usage (e.g., the new account has less than 3 transactions, less than 10 transactions, less than 25 transactions, or some other threshold number). In another embodiment, the new account is less than a certain age (e.g. the new account is less than 3 days old, 10 days old, 2 months old, or some other amount of time). In some embodiments, an account may be deemed to be "new" based on one or more combinations of age and and/or transaction history (e.g., less than a week old or less than 3 total transactions, less than 3 days old and/or less than 10 total transactions, etc.). Thus, in various embodiments, a new account may have had no transactions conducted via an electronic transaction service (such as those provided by PayPal™), or may have a limited number of transactions conducted.

The new account information received in operation 410 may be received from an external system to analysis system 110, or may be received from a storage device and/or database connected directly to analysis system 110, in various embodiments. This new account information may contain any information that pertains to the new account, although does not include transaction history information in various embodiments. In some embodiments, the new account information includes information such as that shown in FIG. 3, e.g., name, address, country, email, etc. Device, software, and/or network information may also be included in the new account information, such as operating system type and/or version (e.g. iOS 7, Windows 10, Android Marshmallow, etc.). Other information about the device may include screen dimensions, processor information, or any other hardware-related information. Software information may include a software version of a web browser that the user is using to attempt an electronic transaction via the electronic transaction service, or a version of an application being used to an attempt the electronic transaction. Network information can include a name of a WiFi network/access point, a network address (e.g. IP address) via which the user is currently connected, one or more historical network addresses that have been previously associated with the user (e.g. an address from which the user signed up for the account, other addresses the user has logged in from, etc.).

In one embodiment, operation 410 includes receiving string data corresponding to a plurality of account characteristics for a new account for an electronic transaction service. This string data may also be normalized (e.g. via cleaning) in some instances to standardize the form of the data so that exact matches with other data for other accounts (e.g. in an account cluster) can be made more readily. Thus, country names may be normalized to a two-character country code, street suffixes like Drive, Avenue, etc. may be standardized and shortened to DR, AVE, etc. Software information, hardware information, etc., may likewise be standardized to allow for easier comparison. Various rules may be used to do this normalization.

In operation 420, in one embodiment, analysis system 110 analyzes a plurality of account characteristics included in the new account information from operation 410. These account characteristics may include any of the information noted above (e.g. contact information for the user, system information, software information, network information, etc.). Analyzing the plurality of account characteristics includes examining values for various ones of the account characteristics, in one embodiment.

In one embodiment, operation 420 may include determining an exact match exists between a particular piece of string data for a new account and respective pieces of string data for a plurality of established accounts for an electronic transaction service (such as one for an electronic transaction payment provider). Determining the string match can be used, in some instances, to build up a list of neighboring accounts (which can later be used in determining what cluster a new account should be assigned to). Thus, a list of neighbor accounts can be built based on each of those accounts having at least one exact string match (such as country code, email domain name, etc.) to a new account. In various cases, the list of neighbors can be built up based on multiple string matches (e.g. for different account characteristics). Analyzing the plurality of account characteristics for a new account can therefore be performed based on an exact string match to a plurality of established accounts.

In operation 430, analysis system 110, prior to receiving any transaction details regarding any electronic payment transactions made with a new account, assigns the new account to a particular account cluster based on similarities in a plurality of account characteristics to corresponding account characteristics of other accounts in the particular account cluster, in one embodiment.

Operation 430 may therefore include being able to assign a new account to one of a number of account clusters without the new account having transaction history. This is a distinction over other possible techniques involving account clustering, where an account may be grouped without other accounts based at least in part on the account's usage history (such as electronic payment transactions, for examples). Using the presently disclosed techniques, however, an account may be clustered in association with the account being opened—which enables better risk assessment in various embodiments. This improved risk assessment may lower the chances that a legitimate account is denied for a transaction (incorrectly), and may increase the chances than an illegitimate account (e.g., corresponding to a bad actor who intends to avoid ultimate payment responsibility) is correctly identified as engaging in a fraudulent transaction, so that the transaction can be denied.

In various embodiments of operation 430, assignment of an account to an account cluster includes either assigning the account to a pre-existing cluster of one or more accounts, or creating a new cluster and assigning the account to the newly created cluster. In order to determine which of one or more existing account clusters to which an account should be assigned (or whether to create a new cluster), various techniques may be used.

In some embodiments, operation 430 includes first finding potential neighbors to a new account. There are potentially millions of other pre-existing accounts in an electronic transaction system as large as that provided by service providers such as PayPal™. Thus, finding potential neighbors may involve various optimizations, as it may be infeasible to compare a new account to millions (even hundreds of millions) of other accounts quickly. Speed can be important here, as a user might apply for a new account and then immediately want to make a purchase using that account. An overall risk assessment process that takes minutes or longer may be too slow for an initial transaction that a user attempts to engage in (if the user has to wait 5 minutes for approval, for example, the user may simply give up and cancel a pending transaction).

When finding potential neighbors to an account, a distributed database (containing account information for a number of accounts, which may belong to multiple different clusters) can first be queried to find at least one other account sharing an account characteristic value with the new account. Some account characteristic values may be shared by a large number of accounts, however, and would produce large number of match values. Email domain is one example. Many, many accounts may have a "gmail.com" domain name (corresponding to Google™ email services). Thus, certain account characteristics may be "blacklisted" when determining potential neighbors for a new account. The domain name gmail.com, for example, can be blacklisted as a result for matching potential neighbors to a new account, as might other extremely common email domain names such as yahoo.com. Numerous other account characteristics can be blacklisted as well, in various embodiments.

Thus, locating potential neighbors for a new account may focus on less common account characteristics, in various embodiments. If there are only 100 accounts out of millions that have a particular email domain name, that email domain name may be a good selection criterion to determine potential neighbors for the new account.

In various embodiments, a list of potential neighbors for a new account is gathered based on database queries to determine other accounts sharing at least one common account characteristic value. This process may be done on a least-common to most-common basis, until a threshold amount of neighbors are discovered (or the process is terminated). In some instances, numerous queries may be made on multiple different account characteristic values in parallel. If an new account shares a postal code with 400 other accounts, an email domain with 38,900 accounts, and a country code with 2,500 accounts, the postal code might be used for the first 400 neighbors, then the country code for the next 2,500 neighbors. The email domain might not be used at all, as the resulting list of neighbors could be too large (e.g., there might be an account limit for determining potential neighbors of 3,000, 10,000, etc.) In other words, values that have less frequency may be preferentially used to values with greater frequency when determining neighbors.

As indicated above, a maximum limit may also be set in determining a number of neighbors for a new account. If the maximum limit is 3,000, for example, less-common values may be used to reach the limit. Accounts that exceed the maximum limit may be discarded as potential neighbors on a first-detected basis in some instances (e.g., if the least common value is 3,200 country codes, only the first 3,000 may be accepted as potential neighbors to the new account).

Finding potential neighbors to a new account, as in some embodiments of operation 430, may be followed by finding a target cluster for the new account. The target cluster can be determined by calculating a similarity between the new account and its neighbors, in various embodiments. If the calculated similarity is not greater than a threshold, in certain instances, the new account is not assigned to an existing cluster but may instead by assigned to a newly created cluster.

For determining a target cluster for a new account, similarities between the account and one or more clusters may be calculated in various way. In one technique, various account characteristics for the new account are compared to account characteristics of accounts in a pre-existing cluster, and for each match, a total value is increased. In one implementation, this may involve assigning equal weight to all similarities, and keeping an aggregate count. E.g., if a new account shares an email address domain name with 10 accounts in a cluster, a postal code with 5 accounts in the cluster, and a country code with 12 accounts in the cluster, a similarity score of 27 (10+5+12) may be assigned to the cluster for the new account.

When determining the target cluster, the comparison process involving the new account may be repeated for each unique cluster that one of the identified neighbors (from an earlier step) belongs to. If 1,000 neighbors are identified, and these neighbors belong to 50 unique clusters, for example, then a comparison process could involve iterating once through the 1,000 accounts to sum up similarity scores per cluster. After this iteration process, the resulting data could be used to determine which of the 50 clusters has the highest score (which may have to be above a threshold).

Different techniques may also be used to calculate similarities between a new account and an account cluster, in some embodiments. Instead of weighting each individual similarity equally (e.g. 1 point for each account in a cluster that shares an email domain name with the new account), variable weightings may be assigned. These weightings may also be given dynamic increases or decreases based on certain factors. A shared street address might be given a weight of zero, one, or any other number. If an account shares a street address, country code, postal code, and city, however, weighting could be dynamically increased (e.g. individual weightings of one could be increased to a total weight of ten, to give an outsized matching effect when all of these individual account characteristics all match together). The numbers used in this example and others, of course, do not limit the techniques described herein, and may vary by embodiment.

In operation 440 of FIG. 4, after an account cluster has been assigned to a new account, a machine learning model may be used to assign a score to the new account based on the assigned cluster, in one embodiment. This score is predictive of a level of risk for the new account, in various embodiments, based on information known about other accounts in the cluster to which the new account is assigned. If the cluster contains 100 other accounts, of which 99 are accounts in good standing (e.g. believed to be non-fraudulent), then the new account may receive a (good) risk score that indicates a relatively low level of risk. If the assigned cluster contains 5 other accounts, all of which are believed to be fraudulent (e.g. based on past transaction history for those accounts, and/or other factors), the new account may receive a risk score indicating a relatively high level of risk.

In some embodiments, a risk score may be assigned to a new account in association with a current transaction that a user of the new account is attempting. Thus, it may be important to be able to determine the risk score relatively quickly—if the risk scoring is too slow, as may occur with other techniques, legitimate users may be deterred from completing their transaction (e.g. a user may cancel a transaction for a purchase of goods or services). Thus, in various embodiments, operation 440 may be completed in near-real time. This may include a delay of only seconds (e.g. 5 seconds, 30 seconds, etc.) instead of minutes or longer in various embodiments. This assessment can be done rapidly in various instances because by limiting the amount of potential neighbors and/or preferentially assigning new accounts to smaller clusters, it can be unnecessary to try to fully process a large data set (again, remember that in electronic payment transaction services such as those provided by PayPal™, there may be many millions of accounts).

Accordingly, a risk score in method 400 may be provided to a risk scoring service run by analysis system 110, transaction system 160, or another system, as part of an overall risk assessment. In some embodiments, transaction system 160 (or another system) has access to risk-related information in addition to the information about an assigned account cluster for a new account. Thus, a risk score from method 400 can be combined with additional information to determine whether or not to approve a particular transaction. Depending on transaction details, even a higher risk score (e.g. for an account belonging to a cluster having many "bad" accounts) may still allow the transaction to be approved, depending on other details (e.g., a very low monetary amount such as a few dollars, or a type of transaction known to be less risky such as purchasing homeowner's insurance for a house).

As noted above, a machine learning model may be used in various embodiments to assign a risk score to a new account based on the account cluster for the new account. This machine learning model may be trained based on previous results available for accounts in a cluster. A historical database may be used, for example, to train a machine learning model using known "good" (e.g. non-fraudulent) accounts and known "bad" accounts (e.g. accounts known to have engaged in one or more fraudulent transactions in the past). Known good accounts and known bad accounts may differ in their account characteristics, and thus, a machine learning model can be built that will look at the characteristics for a new account and then make a prediction as to the riskiness (e.g. possible fraudulent nature) of the new account.

The machine learning model for method 400, in various embodiments, can also interface with more sophisticated offline risk detection models. Offline risk detection models may operate on a non-realtime basis, e.g., they may run at a deep level that may take longer than is acceptable for handling a particular real-time transaction (e.g. such models may not be suitable for determining if a particular electronic payment transaction should be approved). Offline risk models may examine significantly greater quantities of account characteristics and other risk-related data (e.g. transaction data, system data, software data, network data, etc.) to determine what types of accounts are more likely to commit fraud. Results of such an offline risk model can be combined with the near-real time model that is provided in various embodiments of FIG. 4. These results can be used to better train a machine learning model for method 400 to provide more accuracy, e.g., for quickly assessing a given transaction.

In accordance with the above, operation 440 includes predicting a fraud probability in some embodiments. For example, for a particular transaction the new account is engaging in, a fraud probability of 0.20 (e.g. 20%) could be predicted, based on the account cluster for the new account and/or other various risk information (which can include transaction details such as type of good, transaction amount, website or real-world physical location associated with the transaction.

Method 400 also includes, in one embodiment, assigning a network ID to each of a plurality of account clusters. The assigned network ID may be unique ID for each cluster. If a new account cluster is created, e.g., because a sufficient degree of similarity cannot be found between a new account and the clusters to which its identified neighbors belong, then a new network ID may also be generated. The network ID for a cluster can be stored in a distributed database for various accounts in order to enable fast lookup of which cluster different accounts belong to, in various embodiments.

Computer-Readable Medium

Figure 5:
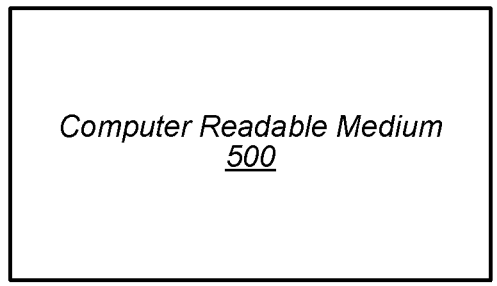
FIG. 5 is a block diagram of one embodiment of a computer readable medium.

Turning briefly to FIG. 5, a block diagram of one embodiment of a computer-readable medium 500 is shown. This computer-readable medium may store instructions corresponding to the operations of FIG. 4 and/or any techniques described herein. Thus, in one embodiment, instructions corresponding to analysis system 110 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script. Note that as used herein, the term "computer-readable medium" refers to a non-transitory computer readable medium.

Computer System

Figure 6:
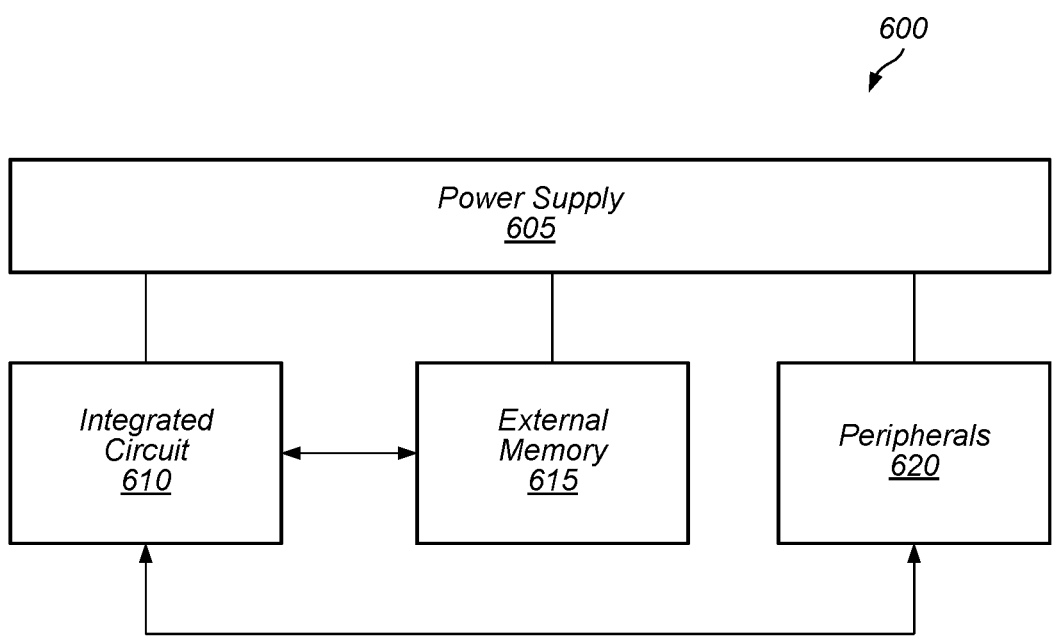
FIG. 6 is a block diagram of one embodiment of a system.

In FIG. 6, one embodiment of a computer system 600 is illustrated. Various embodiments of this system may be analysis system 110, transaction system 160, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a processor; and
a non-transitory computer-readable storage medium having instructions stored thereon that are executable by the processor to cause the system to perform operations comprising:
receiving string data corresponding to a plurality of account characteristics for a new account for an electronic transaction service;
determining a match exists between a particular piece of the string data for the new account and respective particular pieces of string data for a plurality of established accounts for the electronic transaction service;
based on the match, analyzing the plurality of account characteristics for the new account relative to account characteristics for the plurality of established accounts;
without using transaction history data for the new account, and based on the analyzing, assigning the new account to a particular account cluster based on similarities in the plurality of account characteristics to account characteristics of the established accounts; and
using a machine learning model trained by account characteristics of historical transactions of the established accounts and fraud indications of the historical transactions, predicting a first fraud probability of a first new transaction attempted by the new account and a second fraud probability of a second new transaction attempted by the new account based on the assigned particular account cluster.

2. The system of claim 1, wherein the operations further comprise using a least commonly occurring value for the string data for the plurality of established accounts to determine the exact match exists.

3. The system of claim 1, wherein the operations further comprise:

training the machine learning model based on the historical transactions histories of the plurality of established accounts, wherein the historical transactions include indications of whether or not particular past transactions were determined to be fraudulent.

4. The system of claim 1, wherein the operations further comprise determining to not attempt to match a different piece of the string data to pieces of the string data for the plurality of established accounts when potential matches in the pieces of the string data of the plurality of established accounts for the different piece of string data exceed a threshold size limit.

5. The system of claim 1, wherein the operations further comprise:
  receiving an application for the new account; and
  wherein predicting the first or the second fraud probability is performed in less than one minute after receiving the application for the new account.

6. The system of claim 1, wherein the operations further comprise cleaning the string data for the new account and cleaning corresponding string data for the plurality of established accounts prior to determining the match exists.

7. The system of claim 1, wherein determining the exact match is based on one of a group of factors comprising: email address domain name, country code, postal code.

8. A method, comprising:
  receiving, at an analysis computer system, new account information for a new account corresponding to an electronic transaction service;
  analyzing, by the analysis computer system, a plurality of account characteristics included in the new account information;
  prior to receiving any transaction details regarding any electronic payment transactions made with the new account, assigning the new account to a particular account cluster based on similarities in the plurality of account characteristics to corresponding account characteristics of other accounts in the particular account cluster; and
  using a machine learning model trained by account characteristics of historical transactions of the established accounts and fraud indications of the historical transactions, predicting a first fraud probability to a first new transaction attempted by the new account and a second fraud probability to a second new transaction attempted by the new account based on the assigned particular account cluster.

9. The method of claim 8, wherein the new account has been requested for creation by a user, but has not yet been used to complete an electronic payment transaction.

10. The method of claim 8, further comprising assigning a network ID to each of a plurality of account clusters, including the particular account cluster, wherein each network ID assigned uniquely identifies a respective account cluster.

11. The method of claim 8, wherein assigning the new account to the particular account cluster comprises:
  calculating a total of similarities for each of a plurality of account clusters, including the particular account cluster, to the new user account based on the plurality of account characteristics;
  wherein the assigning is done based on the particular account cluster having a highest aggregate score as indicated by calculating the total similarities.

12. The method of claim 11, wherein calculating the total of similarities comprises assigning a weight to an account characteristic for accounts having an identical value for the account characteristic to a value for the corresponding account characteristic for the new user account, and assigning no weight to the account characteristic when the value is not identical.

13. The method of claim 8, further comprising approving or denying the first or the second new transaction involving the new account based on the predicted first or second fraud probability.

14. The method of claim 8, wherein the machine learning model is configured to provide fraud-related scores based on being trained on historical data associated with accounts not known to have engaged in fraud and accounts known to have previously engaged in fraud.

15. The method of claim 8, wherein the electronic transaction service is an electronic payment service allowing electronic payments to be made between different accounts maintained by the electronic transaction service, including the new account.

16. A non-transitory computer-readable medium having instructions stored thereon that are executable by a computer system to cause the computer system to perform operations comprising:
  receiving an indication that a new account corresponding to an electronic transaction service has initiated a transaction;
  analyzing a plurality of account characteristics included in new account information for the new account;
  prior to receiving any transaction details regarding any electronic payment transactions made with the new account, assigning the new account to a particular account cluster based on similarities in the plurality of account characteristics to corresponding account characteristics of other accounts in the particular account cluster;
  using a machine learning model trained by account characteristics of historical transactions of the established accounts and fraud indications of the historical transactions, assigning a first fraud probability to a first new transaction attempted by the new account and a second fraud probability to a second new transaction based on the assigned particular account cluster; and
  determining whether to approve or deny the first or the second new transaction based on the first or the second predicted fraud probability.

17. The non-transitory computer-readable medium of claim 16, wherein the operations further comprise using network information and transaction detail information for the transaction to determine whether to approve the transaction, wherein the transaction detail information includes at least an amount of the transaction.

18. The non-transitory computer-readable medium of claim 16, wherein the machine learning model is configured to provide fraud-related scores based on being trained on historical data associated with accounts not known to have engaged in fraud and accounts known to have previously engaged in fraud.

19. The non-transitory computer-readable medium of claim 16, wherein assigning the new account to the particular account cluster comprises:
  calculating a total of similarities for each of a plurality of account clusters, including the particular account cluster, to the new user account based on the plurality of account characteristics;
  wherein the assigning is done based on the particular account cluster having a highest aggregate score as indicated by calculating the total similarities.

20. The non-transitory computer-readable medium of claim 19, wherein calculating the total of similarities comprises assigning a weight to an account characteristic for accounts having an identical value for the account characteristic to a value for the corresponding account characteristic for the new user account, and assigning no weight to the account characteristic when the value is not identical.

\* \* \* \* \*